Sept. 18, 1928.  1,684,471
G. C. CARHART
CLUTCH
Filed Nov. 14, 1923   3 Sheets-Sheet 1

George C. Carhart — INVENTOR.
BY
Parsons & Birdsall — ATTORNEYS.

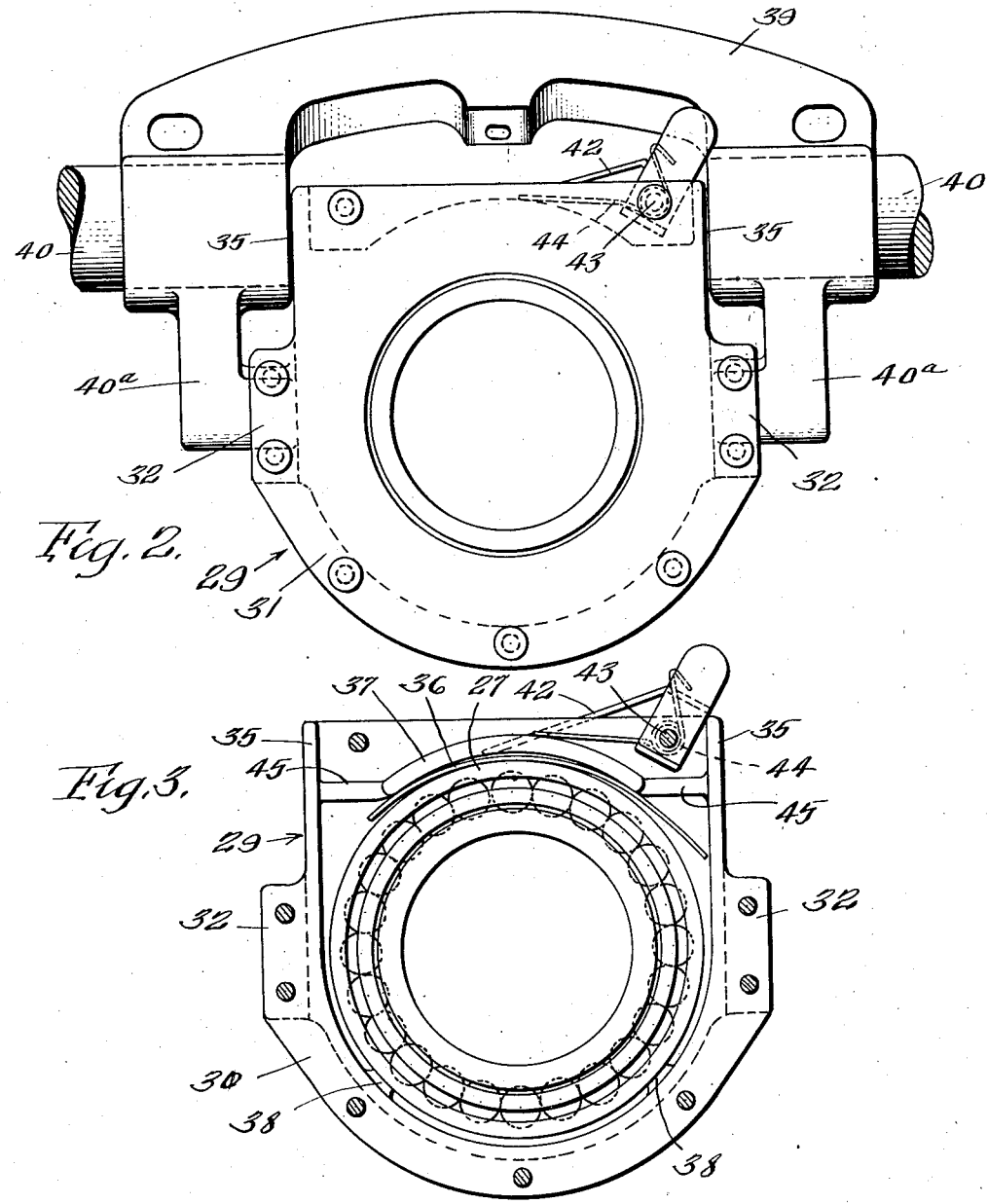

Sept. 18, 1928.
G. C. CARHART
CLUTCH
Filed Nov. 14, 1923   3 Sheets-Sheet 3
1,684,471
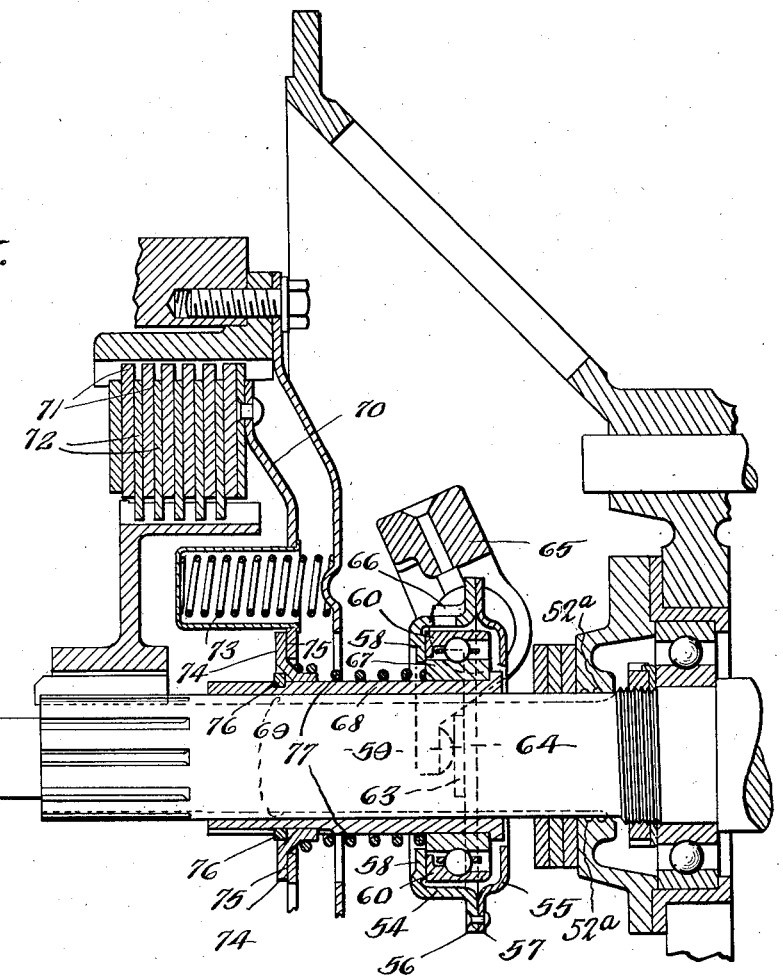
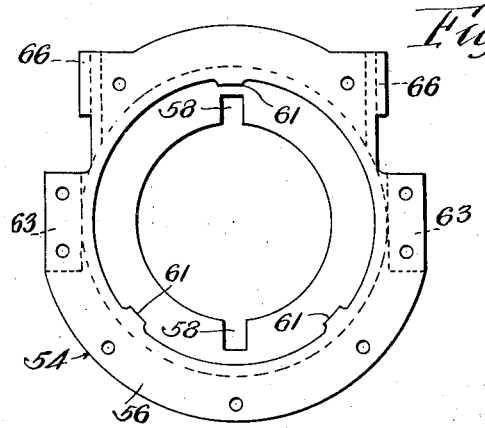
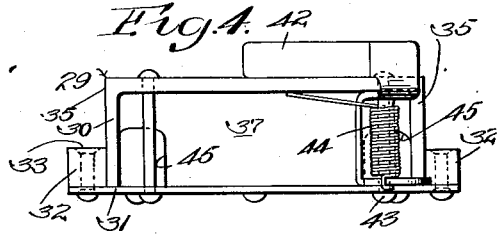
INVENTOR.
George C. Carhart
BY
Parsons & Bodell
ATTORNEYS.

Patented Sept. 18, 1928.

1,684,471

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

CLUTCH.

Application filed November 14, 1923. Serial No. 675,066.

This invention relates to clutches such as are used between the engine and the transmission gearing of motor vehicles and has for its object a particularly simple and efficient structure by which the bearing for the operating or release member or collar, as well as other parts, are lubricated. The invention, for convenience, is called a clutch release bearing housing.

The invention consists in the novel features and in the combinations and constructions hereinafter set forth and claimed.

In describing this invention, reference is had to the accompanying drawings in which like reference characters designate corresponding parts in all the views.

Figure 2 is a rear end elevation of the clutch release bearing, the shifting yoke being also shown.

Figure 3 is a rear elevation, the rear plate or wall of the housing being removed.

Figure 4 is a plan view of the housing.

Figure 5 is a fragmentary view of another form of my invention applied to a disk clutch.

Figure 6 is an inner face view of the front plate of the sheet metal casing shown in Figure 5.

Figure 1:
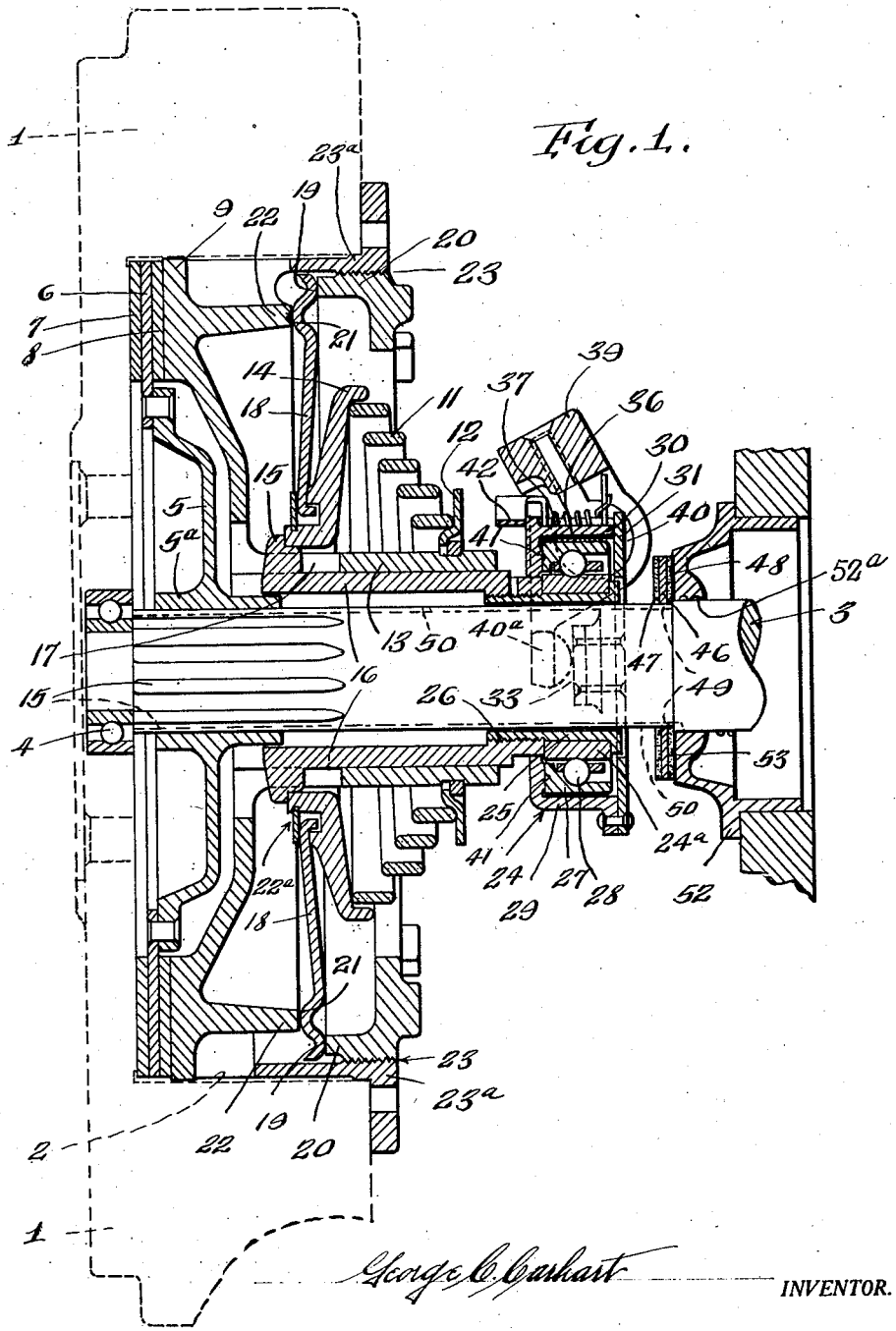
Figure 1 is a vertical sectional view of a clutch embodying my invention, and contiguous parts.

This invention comprises generally a release bearing having an oil receiver or housing or casing for lubricating the bearing and also for supplying oil to the other parts of the clutch, and a brake means coacting with the clutch release bearing to stop the rotation of the clutch when the clutch pedal is actuated to release or throw off the clutch. Some of such parts may be omitted if desired.

The clutch may be of any suitable form, size and construction, that shown in Figure 1, being a single plate clutch comprising driving and driven elements, one of which, usually the driven element, comprises a shaft, and an axially shiftable member, the shiftable member having a sleeve slidable axially on the shaft, and a clutch release bearing embodying an oil receiver or casing, such bearing being a unit against which the actuator or shifting yoke thrusts. The release bearing usually comprises an inner collar mounted on the sleeve and rotatable therewith, an outer ring, anti-friction members as balls between the ring and the collar, and an oil casing enclosing the ring and the collar and thrusting against the ring.

1 designates the driving element which may be the flywheel of the internal combustion engine, which flywheel is formed with an axial cylindrical recess 2. The driven element comprises the shaft 3, having a pilot bearing 4 in the driving element 1, and a member 5 shiftable axially of the shaft 3, the member 5 having a hub 5ª slidably mounted on the shaft 3, and also having an annular plate 6 interposed between friction disks or plates 7, 8 which are interposed respectively between the plate 6 and the driving element 1 and between the plate 6 and a' pressure ring 9. The movement of the pressure ring 9 by the operating mechanism to be described to the left, Fig. 1, compresses the plate 6 and the friction plates 7, 8 toward the driving element 1 and the release of the operating means relieves the pressure on the ring 9 and also permits the plate 6 and the disks 7, 8 to separate to release the clutch, the member 5 or the hub 5ª thereof sliding along the shaft 3 during such operation.

The hub 5ª, as here shown, is connected to the shaft 3 by interlocking lengthwise grooves and projections, that is, the shaft is splined at its inner end, adjacent the pilot bearing 4 and the hub 5ª is formed to fit or interlock with the splined end of the shaft. The ring 9 is thrust in one direction by a comparatively heavy spring and is moved or permitted to move in the other direction to release the clutch by release mechanism operating through the release clutch bearing.

11 designates the main clutch spring which thrusts at its outer end against a spring abutment 12 secured to the hub 13 of the pressure ring 9 and at its other end against a spring abutment 14 thrusting against an annular collar 15 on a slide or sleeve 16 movable axially of the shaft 3 and connected to the clutch release bearing, as will be presently described, the collar 15 extending through slots 17 in the hub 13 of the pressure ring 9.

The power of the spring 11 is applied to the pressure ring 9 through multiplying levers 18 of any suitable construction extending radially relatively to the axis of the clutch, and fulcrumed at 19 at their outer ends on fulcrum or abutment ring 20 and thrusting at 21 near their outer ends against an annular bearing flange 22 on the pressure ring 9 and connected at their inner ends at 22ª to the spring abutment 14. The arrangement of the spring 11 relatively to the pressure ring is such that the spring normally applies a powerful pressure through the levers 18 and, when the release pedal is depressed to withdraw the sleeve 16 and thus relieve the levers 18 from the pressure of the spring, the spring acts against the abutment 12 to positively withdraw the pressure ring 9 and release the clutch.

The abutment or fulcrum ring 20, as here shown, threads at 23 into an annular ring 23ª bolted to the driving element 1 at the outer end of the recess 2, and such abutment ring 20 is adjustable by turning it inwardly or outwardly to adjust the levers 18. The construction of the clutch forms no part of my present invention and any suitable clutch construction may be used in connection with my invention.

The release mechanism comprises a bearing connected to the sleeve or slide 16 and an actuator as a yoke, operated by a foot pedal coacting with the bearing to withdraw the sleeve or slide in one direction, as to the right, to relieve the levers 18 and the pressure ring 9 to relieve them of the spring 11.

24 designates the clutch release bearing, as a whole, which bearing is mounted on a sleeve 25 slidable on the shaft 3 and connected to the sleeve or slide 16, as at 26. The clutch release bearing comprises a collar 24ª mounted on the sleeve 25 to rotate and slide axially therewith, an outer ring 27, and anti-friction members as balls 28 between the collar and the ring. 29 designates the oil casing or housing, this casing enclosing the bearing 24, it being carried by the ring 27 and coacting with the actuator or yoke to be held from rotation thereby. In the construction shown in Fig. 1, the casing includes a body 30 in the form of a box and a rear cover plate 31, the body having outwardly extending parts or flanges 32 provided with forwardly facing bearing surfaces 33 on opposite sides of the shaft against which faces the arms of the actuator or yoke thrust, the box, also, having an upward extension 35.

As here illustrated, the casing is suspended on the bearing and engages therewith at a plurality of spaced apart points, it being shown as supported by a bow spring 36 arranged between the top wall 37 of the case and the upper side of the ring 27, the spring bearing at its ends on the ring. The top wall 37 is suitably formed to receive the bow spring 36. The casing or box is also formed on its lower side with two inwardly projecting lugs 38 which contact with the lower portion of the ring.

39 is the actuator or yoke, which is mounted upon a shaft or shafts 40 suitably supported in the casing of the clutch, in any well known manner, the yoke embracing the release bearing and the oil casing and having its arms 40ª on the lower side of its axis thrusting against the parts or flanges 32 on diametrically opposite sides of the shaft 3, and the lateral sides of the extension 35 of the box engage the yoke arms near the axis of the yoke arms or the ends of the shafts on which the yoke is mounted, and thus the box is held from turning. The spring 36 and the lugs 38 hold the ring 27 from turning. Preferably the casing 29 is mounted to have an equalizing action relatively to the yoke and, as here illustrated, the casing is fulcrumed so as to have an equalizing rocking movement about an upright axis midway between the points of engagement of the yoke arms 40ª with the casing 29. Preferably, the casing is provided with diametrically-arranged inwardly-extending lugs 41 thrusting against the front side of the ring 27 above and below the shaft 3 and midway between the points of engagement of the yoke arms with the casing. The yoke is actuated in any suitable manner as by the usual foot pedal.

The casing is also shown as being provided with means as a gage for determining the proper adjustment of the clutch and, as here shown, this gage comprises an arm 42 movable vertically across the front side of the casing and pivoted at 43 in the recess provided by the curved top wall 37 of the box, this arm and its pivot bearings being formed from sheet metal. A suitable coil spring 44 tends to move the arm upwardly. In adjusting the clutch, this arm is swung downwardly and the yoke 39 actuated to release the clutch, the yoke being actuated far enough to hold the arm between the end of the hub 13 of the pressure ring and the front face of the oil casing 29. The abutment ring 20 is then turned to take up the looseness between the levers 18 and their fulcrum and pivotal points and then the clutch pedal released, the gage 42 then being moved by its spring upwardly to its normal inactive position. The gage determines the amount of adjustment required of the abutment 20. The oil casing 29 is provided with suitable oil holes 45 by means of which oil can be injected into the casing 29.

This release bearing also coacts with a brake for stopping the rotation of the driven element of the clutch when the clutch is released. This brake, as here shown, consists of brake disks mounted on and keyed to the shaft 3 between the release bearing and a support for the rear end of the shaft 3.

46 designates the brake ring. 47 and 48 are friction disks mounted on opposite sides of the ring 46. The ring 46 has tongues or keys 49, which slide in grooves 50 extending lengthwise of the shaft, these grooves extending to the front end of the shaft and being alined with some of the grooves 15 at the front splined end of the shaft 3, and each groove 50 serves as a duct to conduct the oil from the oil casing to the pilot bearing 4 and to the sleeve 25 or any part slidable on the shaft 3.

The support for the rear end of the shaft 3 is usually the front wall of the transmission gear case to which the shaft 3 transmits power and, as here shown, is a bearing cap 52 mounted in the front wall of the case of the transmission gearing, the end surface 53 of this cap serving as an abutment for the brake consisting of the ring 46, and disks 47 and 48. Upon the depression of the foot pedal, the release bearing is forced rearwardly and the rear wall or cover plate of the housing 29 thereof engages the friction disk 47 and slides the ring 46, and disks 47 and 48 rearwardly along the shaft 3 against the end face 53 of the bearing cap 52 and, as the ring 46 is keyed to the shaft, retards and stops the rotation of the shaft 3.

As shown in Figures 5 and 6, the clutch release bearing housing or casing is formed of sheet metal and comprises front and rear plates 54, 55, having outwardly extending flanges 56, 57, which are riveted or otherwise secured together. The front wall of the front plate has inwardly projecting bosses 58 arranged diametrically opposite each other above and below the shaft 59 of the clutch, these bosses fulcruming against the outer ring 60 of the lateral side or the circumferential side of the bearing. Also the wall of the front plate 54 is formed with inwardly and radially extending bosses or projections 61 spaced apart for engaging the periphery of the outer ring 60, and thus supporting the oil case or housing on the ring 60, and also holding the ring from rotation. The flange 56 of the front plate is also provided with bearing parts or blocks 63 on diametrically opposite sides of the shaft and midway between the lugs or projections 58, for coacting with the arms 64 of the yoke 65. Also, the flanges 56 near the upper end of the yoke are formed with angularly turned lugs 66 which engage the yoke arms 64 near the axis of the yoke or the ends of the shaft on which the yoke is mounted, the engagement being for the purpose of holding the oil housing from rotation.

The collar 67 is mounted upon a sleeve 68 slidable axially of the shaft 59 and covering the oil ducts 69 therein. The sleeve is connected at its inner end to the pressure member 70 of the clutch which operates to compress the disks 71 and 72 of the driving and driven elements of the clutch. A series of springs 73 act on the pressure member 70, to thrust it in one direction to engage the disks and said member is shifted in the opposite direction by the yoke 65, acting through the release bearing and the sleeve 68.

The sleeve 68 is connected to the member 70 by a ring or collar 74 keyed to the sleeve 68 and interlocking at 75 with the pressure member 70, this collar 74 thrusting against an abutment ring 76 arranged in an annular groove in the sleeve 68. A suitable spring 77 is interposed between the release bearing and the collar 74 and tends to thrust the collar against the abutment 76 and holds the parts from rattling. In the construction shown in Figs. 5 and 6 the oil from the release bearing housing finds its way to the ducts 69 and through the grooves and splines at the end of the shaft 59 on which the driven member is mounted to the pilot bearing.

In clutches of this type, the pilot bearing in the front end of the clutch shaft is difficult to lubricate, and usually is not lubricated except by such lubricant as may find its way haphazard fashion to the pilot bearing. By reason of the outside oil ducts or grooves 50 or 69, oil is conducted along the outside of the clutch shaft from any source of supply to the pilot bearing 4 through the splines 15. The main lubricant source of supply in this clutch is the housing for the throw-out bearing, which is made to hold oil. Necessarily, the oil will find its way from the throw-out bearing to the periphery of the clutch shaft 3 on which the bearing slides. The rotation of the shaft tends to feed the oil along the shaft or the rotation of the driving parts of the clutch about the shaft with the engine when the clutch is disengaged, tends to so feed the oil. Another source of supply is the bearing cap 52 at the front end of the transmission gear casing. The transmission gearing runs in a lubricant and the oil tends to feed along the shaft out of the casing. The oil thus fed out is conducted to the pilot bearing of the clutch through the grooves 50 or 69, Figure 5 to the pilot bearing. To facilitate the feeding of the oil from the bearing cap 52, the bearing cap is provided with oil grooves 52ª in the portion thereof bearing on the shaft.

What I claim is:

1. In a clutch, the combination of a shaft, a member shiftable axially of the shaft, means for shifting said member, including a release bearing concentric with the shaft, an oil casing enclosing said and an actuator, supported thereby, the actuator bearing, and comprising a yoke embracing the bearing and the casing, and having arms thrusting against the casing on diametrically opposite sides of the shaft, and the casing having fulcrum points thrusting against the bearing and located midway between the points, of engagement of the yoke arms with the casing.

2. In a clutch, the combination of a shaft, a member shiftable axially of the shaft, means for shifting said member, including a release bearing concentric with the shaft, and an actuator, an oil casing enclosing said bearing, and supported thereby, the actuator comprising a yoke embracing the bearing and the casing, and having arms thrusting against the casing on diametrically opposite sides of the shaft, and the casing having fulcrum points thrusting against the bearing and located midway between the points of engagement of the yoke arms with the casing, the casing extending between the arms of the yoke and engaging such arms, whereby the casing is held from rotation.

3. In a clutch, the combination of a shaft, a member shiftable axially of the shaft, means for shifting said member, comprising a collar on the shiftable member, and arranged concentric with the shaft, and rotatable with the shiftable member, a bearing ring encircling the collar, antifriction members between the collar and the bearing ring, an actuator coacting with said ring, and acting to thrust against the same, and an oil casing enclosing the collar and the bearing ring, the oil casing having bearing parts arranged to receive the thrust of the actuator, and the casing having fulcrum points on diametrically opposite sides of the ring, and midway between the points of engagement of the shifter and the bearing parts of the casing.

4. In a clutch, the combination of driving and driven elements, the driven element comprising a shaft having a pilot bearing in the driving element, and a clutch member shiftable axially of the shaft, means for shifting said member, comprising a throw-out bearing mounted on said shaft, an oil casing enclosing the bearing, an actuator arranged to shift the bearing and hence said shiftable member, the shaft being formed with an external lengthwise passage connecting the oil casing and the pilot bearing.

5. In a clutch, the combination of driving and driven elements, the driven element comprising a shaft having a pilot bearing in the driving element, and the driven element also comprising a member slidable axially of the shaft adjacent to the pilot bearing, the shaft being formed with lengthwise grooves and splines, and said member having a hub slidably fitting the grooves and splines, the shaft being also formed with an oil duct extending lengthwise thereof, and alined with one of the grooves, means for controlling the shifting of the slidable member, comprising a sleeve mounted on the shaft for covering said duct, a bearing on said sleeve, an oil casing enclosing the bearing, and an actuator coacting with the bearing, said duct being arranged to conduct the oil from the oil casing to the pilot bearing.

6. In a clutch, the combination of driving and driven elements, the driven element comprising a shaft, a clutch member having a bearing on the shaft and slidable axially thereof, means for controlling the shifting of the slidable member including a throw-out bearing, an oil casing enclosing the throw-out bearing, and an actuator coacting with the bearing, the shaft of the driven element being formed with a lengthwise peripheral oil duct connecting the oil casing for the throw-out bearing and the bearing of the slidable member on the shaft.

7. In a clutch, the combination of driving and driven elements, the driven element comprising a shaft having a pilot bearing on the driving element, and a shiftable member slidable axially of the shaft, means for controlling the shifting of said slidable member, comprising a throw-out bearing slidable on the shaft, an oil casing enclosing the throw-out bearing, an actuator arranged to shift the bearing, the shaft of the driven element being formed with a lengthwise peripheral oil duct connecting the oil casing for the throw-out bearing and the bearing of said slidable element and the pilot bearing.

8. In a clutch, the combination of driving and driven elements, the driven element comprising a shaft having a pilot bearing in the driving element and a clutch member slidable axially of the shaft, means for controlling the shifting of the slidable clutch member, the shaft having an external peripheral oil duct extending lengthwise thereof to the pilot bearing and means for supplying the oil to said duct in the rear of the clutch.

9. In a clutch, the combination of driving and driven elements, the driven element comprising a shaft having a pilot bearing in the driving element and a clutch member slidable axially of the shaft, means on the shaft for controlling the shifting of said member, a lubricated bearing for the shaft in the rear of the clutch and an external oil duct extending lengthwise of the shaft and communicating with the pilot bearing, the oil duct also communicating at the rear end with said lubricated bearing.

In testimony whereof, I have hereunto signed my name, at Syracuse, in the county of Onondaga, and State of New York, this 20th day of October, 1923.

GEORGE C. CARHART.